United States Patent
Mizobata

(10) Patent No.: US 8,696,060 B2
(45) Date of Patent: Apr. 15, 2014

(54) SEAT BACK FRAME

(71) Applicant: Toyota Boshoku Kabushiki Kaisha, Aichi-ken (JP)

(72) Inventor: Hiroshi Mizobata, Seto (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/667,332

(22) Filed: Nov. 2, 2012

(65) Prior Publication Data

US 2013/0119737 A1    May 16, 2013

(30) Foreign Application Priority Data

Nov. 11, 2011  (JP) .................................. 2011-247435

(51) Int. Cl.
*B60N 2/427* (2006.01)

(52) U.S. Cl.
USPC ................................ 297/216.12; 297/216.13

(58) Field of Classification Search
USPC ............. 297/216.12, 216.13, 452.18, 216.14
See application file for complete search history.

(56) References Cited

U.S. PATENT DOCUMENTS

2008/0073951 A1* 3/2008 Hattori et al. ............ 297/216.12
2012/0032480 A1* 2/2012 Orzelski .................. 297/216.12

FOREIGN PATENT DOCUMENTS

JP          11-216037          8/1999

* cited by examiner

*Primary Examiner* — Milton Nelson, Jr.
(74) *Attorney, Agent, or Firm* — Greenblum & Bernstein, P.L.C.

(57) ABSTRACT

A seat back frame includes an upper frame member that forms an upper side, a reinforcing member that is provided parallel to and below the upper frame member, and a headrest mounting member, that overlaps with both the upper frame member and the reinforcing member. The headrest mounting member is arranged such that, in one location, from among a location where the headrest mounting member overlaps with the upper frame member and a location where the headrest mounting member overlaps with the reinforcing member, the headrest mounting member is fixed to one of the upper frame member and the reinforcing member, and in the other location, the headrest mounting member abuts against the other of the upper frame member and the reinforcing member when the headrest tilts rearward about the one location, such that the tilting of the headrest is inhibited.

6 Claims, 5 Drawing Sheets

SEAT BACK FRAME

INCORPORATION BY REFERENCE

The disclosure of Japanese Patent Application No. 2011-247435 filed on Nov. 11, 2011 including the specification, drawings and abstract is incorporated herein by reference in its entirety.

BACKGROUND OF THE INVENTION

1. Field of the Invention

The invention relates to a seat back frame of a vehicle seat, in which a headrest is able to be mounted to an upper portion of the seat back frame.

2. Description of Related Art

In a vehicle seat provided with a headrest for supporting a head of an occupant at an upper portion of a seat back, typically, a metal headrest mounting member is fixed to an upper portion of a seat back frame, and a headrest is attached to this headrest mounting member. More specifically, cylindrical headrest support made of resin is attached to this headrest mounting member, and the headrest is held to the seat back frame by a stay that extends down below the headrest being inserted into this headrest support. A seat back frame provided with such a headrest mounting member is described in Japanese Patent Application Publication No. 11-216037 (JP 11-216037 A) below, for example.

This seat back frame described in JP 11-216037 A includes an upper frame member that forms an upper side, and a reinforcing member provided parallel to and below the upper frame member. The headrest mounting member is fixed by being welded so as to cross over the upper frame member and the reinforcing member that are arranged one above the other. Having the headrest mounting member be fixed to the seat back frame in two locations, one upper and one lower, in this way makes it possible to ensure the rigidity necessary to support the head of the occupant with the headrest when a vehicle is collided with from the rear (hereinafter referred to as "when a collision occurs"), and is thus a measure against whiplash to the occupant.

Typically, when a vehicle is running or idling (hereinafter referred to as "during normal operation"), a floor panel resonates at a particular frequency (a resonance point) with an engine, and this vibration is also transmitted to the headrest via the seat frame that is fixed to the floor panel, regardless of whether an occupant is seated in the seat. According to the technology described above, rigidity for supporting the occupant is able to be ensured as described above by increasing the support rigidity of the headrest mounting member. However, the resonance frequency of the headrest (i.e., of the resonance with respect to the seat back frame) increases to close to the resonance point of the floor panel described above, so the headrest will end up amplifying the vibration level of the floor panel and vibrating, which is problematic.

Here, if the support rigidity of the headrest mounting member can be reduced, the vibration of the headrest can be reduced, but on the other hand, the rigidity for supporting the occupant when a collision occurs will also end up decreasing. That is, increasing the support performance for an occupant when a collision occurs and suppressing vibration of the headrest are technologically contradictive tasks as long as the support rigidity of the headrest mounting member is simply adjusted (i.e., increased and decreased). It is also possible to reduce the resonance frequency of the headrest by increasing the mass of the headrest, but this would result in a corresponding increase in both vehicle mass and cost, which is undesirable.

SUMMARY OF THE INVENTION

In view of the foregoing problems, the invention thus provides a seat back frame that suppresses vibration of a headrest during normal operation, while ensuring support performance for an occupant when a collision occurs.

A one aspect of the invention relates to a seat back frame of a vehicle seat, in which a headrest is able to be mounted to an upper portion thereof. This seat back frame includes an upper frame member that forms an upper side, a reinforcing member that is provided parallel to and below the upper frame member, and a headrest mounting member for mounting the headrest, that overlaps with both the upper frame member and the reinforcing member when viewed from a front. The headrest mounting member is arranged such that, in one location, from among a location where the headrest mounting member overlaps with the upper frame member and a location where the headrest mounting member overlaps with the reinforcing member, the headrest mounting member is fixed to one of the upper frame member and the reinforcing member, and in the other location, the headrest mounting member abuts against the other of the upper frame member and the reinforcing member when the headrest tilts rearward about the one location, such that the tilting of the headrest is inhibited.

According to this structure, during normal operation or when a collision occurs, the support rigidity of the headrest from the seat back frame changes. The headrest mounting member is arranged overlapping with both the upper frame member and the reinforcing member, and is fixed to one of the two (i.e., either the upper frame member or the reinforcing member) at one location, from among the locations where the headrest mounting member overlaps with the upper frame member and the reinforcing member when viewed from a front of the seat in a longitudinal direction of a vehicle. Therefore, during normal operation, the headrest mounting member is supported by the upper frame member or the reinforcing member at only the one location. Also, at the other location, the headrest mounting member abuts against the other of the upper frame member and the reinforcing member when the headrest tilts rearward about the one location, such that the tilting of the headrest is inhibited. Accordingly, it is possible to ensure the support rigidity of the headrest necessary to support the occupant when a collision occurs, but also reduce the support rigidity so that it is lower during normal operation than it is when a collision occurs, by the headrest being supported only at the one location during normal operation. That is, vibration of the headrest during normal operation can be suppressed while ensuring support performance for the occupant when a collision occurs.

In the seat back frame according to the aspect of the invention described above, the member in the other location where the headrest mounting member overlaps may be the upper frame member, and the upper frame member may have a pipe-shape with a round cross-section.

According to this structure, the member in the other location where the headrest mounting member overlaps is the upper frame member, and this upper frame member has a pipe-shape with a round cross-section. Also, as described above, the headrest mounting member does not need to be fixed to this upper frame member, so there is no need to partially crush the pipe shape of the upper frame member to form a flat surface for welding or the like. Therefore, the pipe shape is able to retain its original bending strength, so the support performance for the occupant when a collision occurs is able to be even better ensured.

In the seat back frame according to the aspect of the invention described above, abutment at the other location where the headrest mounting member overlaps may be performed via cushioning material.

According to this structure, vibration of the headrest is absorbed by the cushioning material, by the headrest mounting member repeatedly abutting against, or being kept abutted against, the upper frame member or the reinforcing member via the cushioning material, at the other location where the headrest mounting member overlaps.

Therefore, vibration of the headrest is able to be better suppressed, and abnormal noise resulting from the headrest mounting member repeatedly abutting against the upper frame member or the reinforcing member can be prevented from occurring.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
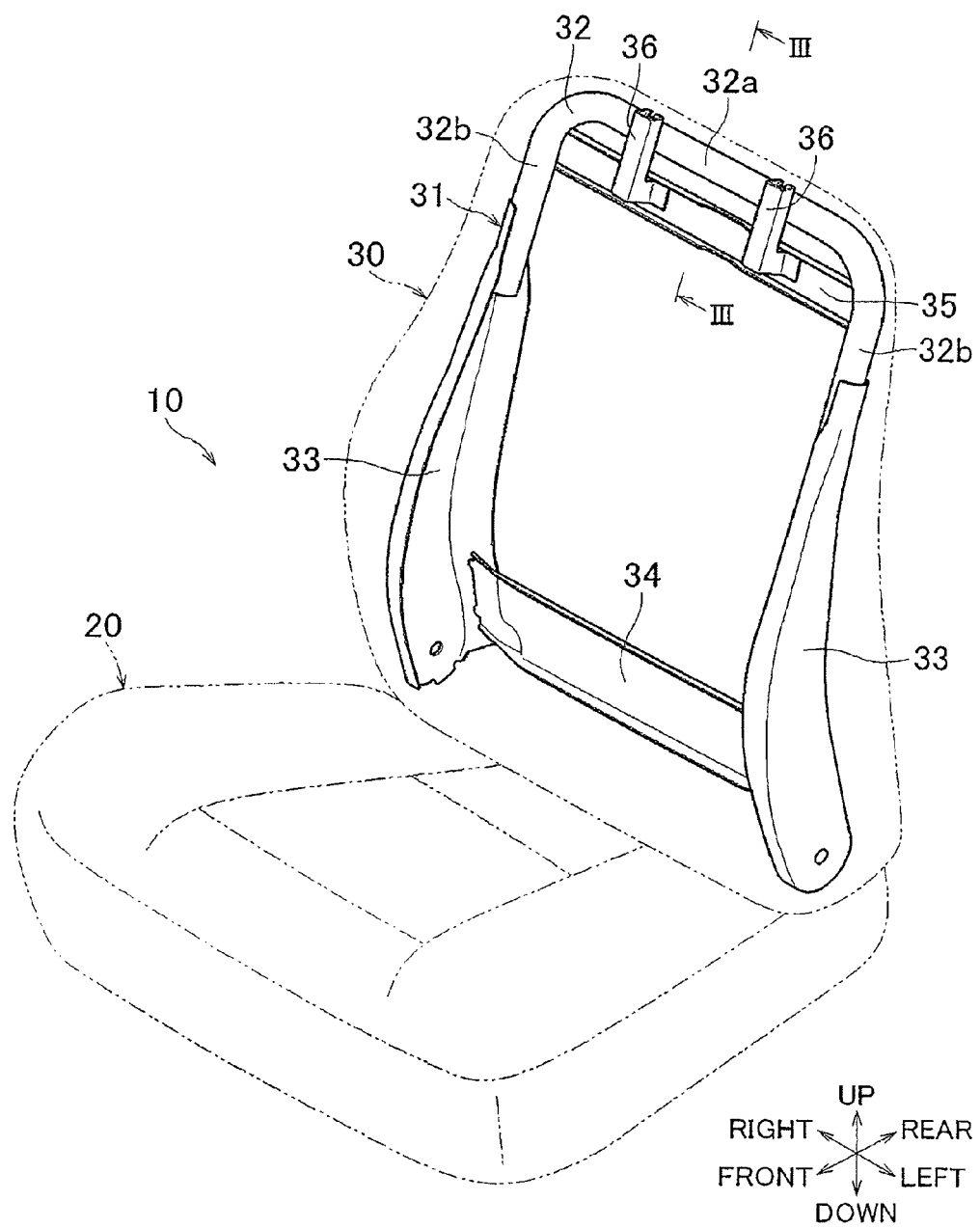
FIG. 1 is a perspective view of a vehicle seat according to an example embodiment of the invention.
Figure 2:
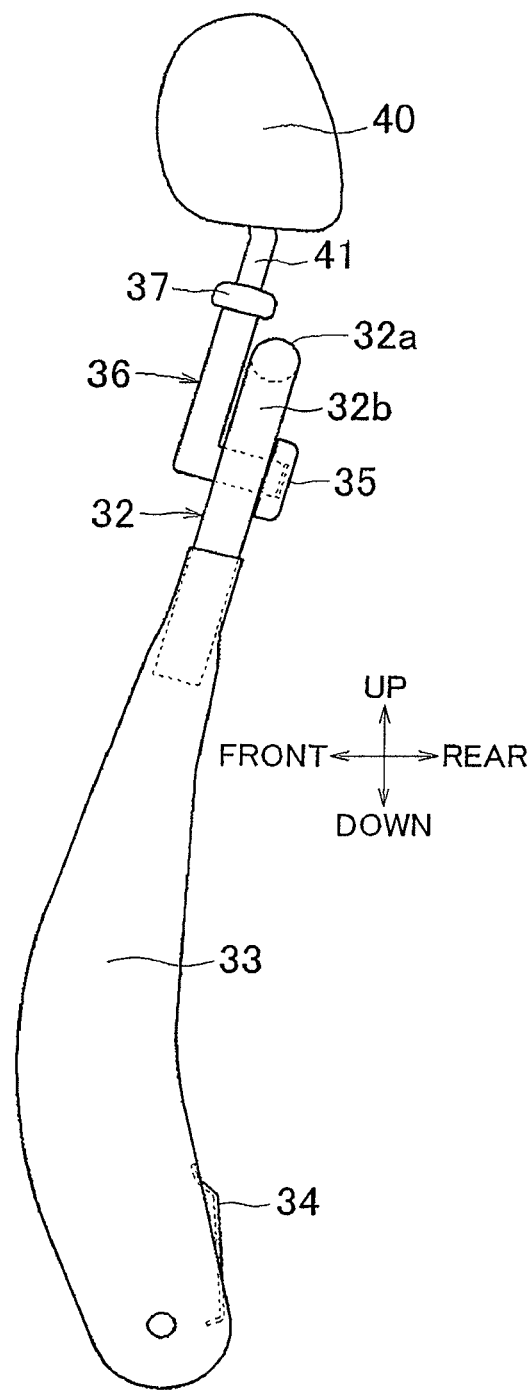
FIG. 2 is a side view of a seat back frame and a headrest according to the example embodiment.
Figure 3:
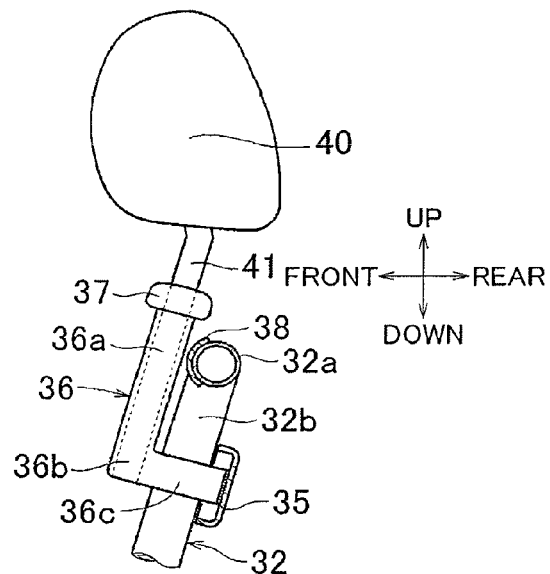
FIG. 3 is a sectional view taken along line III-III in FIG. 1 of a mounting portion of the headrest according to the example embodiment.

Hereinafter, example embodiments of the invention will be described with reference to FIGS. 1 to 3. In FIG. 1, the outer shape of a seat 10 provided in a vehicle and used by an occupant is denoted by the alternate long and two short dashes lines. The seat 10 includes a seat cushion 20 on which the occupant sits, a seat back 30 that serves as a backrest for the occupant, and a headrest 40 (see FIG. 2) that supports the head of the occupant. The seat back 30 is connected to a rear end portion of the seat cushion 20. The angle between the seat back 30 and the seat cushion 20 is able to be adjusted by a reclining apparatus, not shown, provided at this connecting portion. The seat back 30 has a metal seat back frame 31 that has a generally rectangular frame shape such as is shown by the solid lines in FIG. 1, as a member that forms the frame of the seat back 30. In addition to the seat back frame 31, the seat back 30 also has a pad member that is a cushion that covers the seat back frame 31, as a member that forms the outer shape (shown by the alternate long and two short dashes lines in FIG. 1) that includes the backrest surface, and a cover that covers the pad member. Also, the headrest 40 that supports the back of the head of a seated person is attached to an upper portion of the seat back 30. The seat back frame 31 mainly includes an upper frame 32, side frames 33, and an under frame 34. These constituent members are integrally joined together by welding to form a frame structure having a generally rectangular frame shape. The side frames 33 are members each having a long plate shape that are vertically arranged on the left and right, and form side portions 32b of the frame structure. The upper frame 32 is a member having a pipe shape with a round cross section, and is bent into a generally inverted U-shape. The upper frame 32 is arranged extending between upper ends of the two side frames 33, and form upper portions of the side portions 32b and an upper portion 32a. The under frame 34 is a long plate-shaped member and is transversely arranged to the inside of the lower portions of both the left and right side frames 33.

A reinforcing member 35 that reinforces the upper frame 32 is provided on the seat back frame 31. The reinforcing member 35 is made of metal and is a long plate-shaped member, i.e.; a member in the shape of a long strip. The reinforcing member 35 is arranged extending between the left and right side portions 32b of the upper frame 32, oriented such that the width direction of the reinforcing member 35 is in the vertical direction, and is parallel to the upper portion 32a. Each end portion of the reinforcing member 35 is fixed by welding to a rear side of the corresponding side portion 32b. Also, the edges on both sides in the width direction of the reinforcing member 35 are bent toward the front along the entire length, or part of the length, of the reinforcing member 35. Further, support brackets 36 for attaching headrest supports 37 are provided on the seat back frame 31. The support brackets 36 are metal members each of which has an angular tube-shaped main body. Hereinafter, portions such as the support brackets 36 and the headrest supports 37 may be described in the singular to simplify the description. The support bracket 36 is arranged overlapping with the front surfaces of the upper frame 32 and the reinforcing member 35. A fixing portion 36c that extends in the direction of the reinforcing member 35 as shown in FIG. 3 is provided on a main body lower portion 36b of the support bracket 36 that faces the reinforcing member 35. A tip end of the fixing portion 36c is fixed by welding to the front surface of the reinforcing member 35. Meanwhile, as is well shown in FIG. 3, a main body upper portion 36a of the support bracket 36 that faces the upper frame 32 is not fixed to the upper frame 32, and is separated from the upper frame 32 by a small gap. Felt 38 is placed at a location on the surface of the upper frame 32 where the upper frame 32 faces the main body upper portion 36a of the support bracket 36 in order to prevent abnormal noise from being produced by these members abutting against each another.

The headrest 40 has metal stays 41 each of which has a rod-shape that extends downwards. These stays 41 are attached to the support brackets 36 via the headrest supports 37. The headrest supports 37 are resin members each of which has a main body having a round tube-shape, not shown. These headrest supports 37 are fixed by being inserted into the angular tube-shapes of the support brackets 36 (see FIG. 1). Only the main body upper end portion of one headrest support 37 is shown in FIGS. 2 and 3. Meanwhile, the stays 41 of the headrest 40 are inserted through the round tube-shapes of the headrest supports 37. The stays 41 are configured to be able to be vertically positioned and fixed to the headrest supports 37 by well-known means provided on the main body upper end portions. As a result, the amount that the headrest 40 protrudes up from the seat back 30 is able to be adjusted to match the height position of the head of a seated person. When the stays 41 are positioned and fixed to the headrest supports 37, the headrest 40 is attached to the seat back frame 31. The support brackets 36 in this example embodiment serve as a headrest mounting member.

Figure 4A:
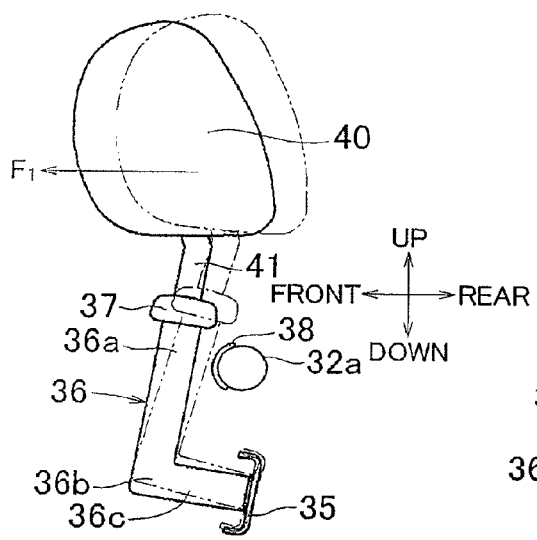
FIG. 4A is a view illustrating operation when forward force is applied to the headrest according to the example embodiment.
Figure 4B:
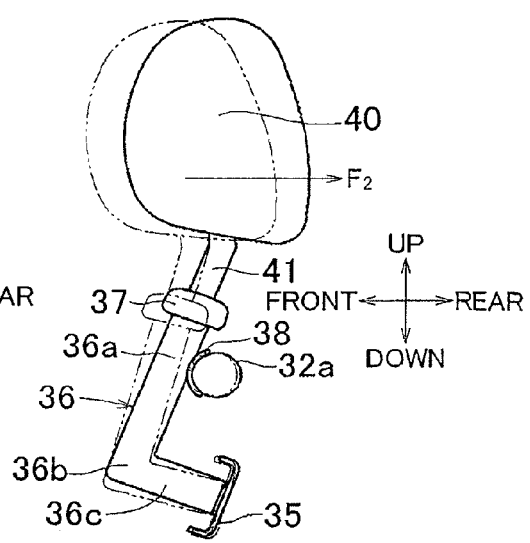
FIG. 4B is a view illustrating operation when rearward force is applied to the headrest according to the example embodiment.

Next, operation of the structure described above when forces $F_1$ and $F_2$ are applied to the headrest 40 will be described with reference to FIGS. 4A and 4B. FIGS. 4A and 4B are both simplified views of an area shown in FIG. 3. The behavior when force is applied to the headrest 40 can be understood by a model in which the headrest 40 is elastically supported with respect to the seat back frame 31. As described above, the main body lower portion 36b of each support bracket 36 is fixed to the reinforcing member 35 via the fixing portion 36c, but the main body upper portion 36a is not fixed to the upper frame 32. That is, the headrest 40 is basically supported with respect to the seat back frame 31 by only the reinforcing member 35. Therefore, when forces $F_1$ and $F_2$ are applied in the front-rear direction to the headrest 40 that is positioned above the seat back frame 31, elastic torsional deformation and the like of the reinforcing member 35 occurs, and the support bracket 36 tilts forward and backward about the fixing portion 36c provided on the main body lower portion 36b. In FIGS. 4A and 4B, the state before the support bracket 36 tilts is shown by the broken line, and the state after the support bracket 36 tilts is shown by the solid line. However, the support bracket 36 is arranged on the front side of the upper frame 32 as described above. When the force $F_1$ in the forward direction acts on the headrest 40 as shown in FIG. 4A, the support bracket 36 is able to tilt forward without being blocked by the upper frame 32, but when the force $F_2$ in the rearward direction acts on the headrest 40 as shown in FIG. 4B, the main body upper portion 36a of the support bracket 36 abuts against the upper frame 32 that is to the rear of it, via the felt 38. After the support bracket 36 abuts against the upper frame 32, elastic flexural deformation occurs in the upper frame 32, in addition to the deformation of the reinforcing member 35. Considering this, the support rigidity of the headrest 40 with respect to the seat back frame 31 will be greater when the force $F_2$ in the rearward direction is applied than it will be when the force $F_1$ in the forward direction is applied.

Figure 5:
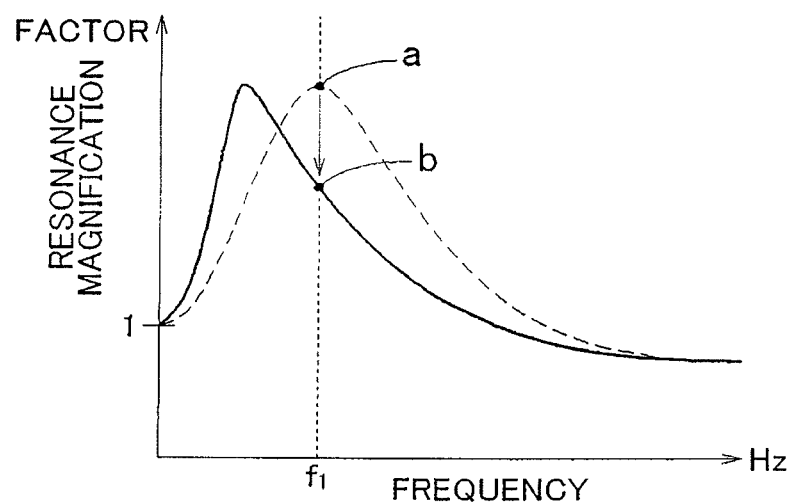
FIG. 5 is a graph showing a decrease in resonance magnification of the headrest according to the structure of the example embodiment.

The example embodiment structured as described above displays operation and effects such as those described below. Typically, a floor panel of a vehicle resonates at a specific frequency with the engine, and this vibration is also transmitted to the headrest 40 via the seat frame that is fixed to the floor panel, regardless of whether an occupant is seated in the seat. The headrest 40 is such that the resonance frequency of vibration with respect to the seat back frame 31 becomes higher as the support rigidity from the seat back frame 31 increases. Also, as shown in FIG. 5, as this resonance frequency becomes closer to the resonance point of the floor panel described above, the vibration level of the floor panel is magnified, such that the headrest 40 starts to vibrate. In the line graph shown in FIG. 5, when the resonance frequency of a typical floor panel reaches $f_1$, a peak value of the resonance magnification when the support bracket 36 is supported by both the upper frame 32 and the reinforcing member 35 of the related art shown by the broken line is in the same position as $f_1$, and the vibration of the floor panel is amplified the most and transmitted to the headrest 40. In contrast, with a structure in which the support bracket 36 is basically supported by only the reinforcing member 35, as is in this example embodiment, the support rigidity is weaker, so the peak value is lower than $f_1$, as shown by the, solid line in FIG. 5. As a result, the resonance magnification of the headrest 40 is able to be reduced from point "a" of the related art to point "b". Therefore, the vibration level of the headrest 40 that occurs during normal operation such as when the vehicle is running is able to be suppressed. Also, when the support bracket 36 is tilted toward the rear about the fixing portion 36c provided on the main body lower portion 36b, the main body upper portion 36a of the support bracket 36 abuts against the upper frame 32 and is thus inhibited from tilting. Therefore, when the headrest 40 receives a rearward impact load from the head of an occupant when a collision occurs, the main body upper portion 36a of the support bracket 36 abuts against the upper frame 32, so the support bracket 36 becomes supported by both the upper frame 32 and the reinforcing member 35, thus making it possible to ensure the support rigidity of the headrest 40 necessary to support the occupant. Accordingly, it is possible to suppress vibration of the headrest 40 during normal operation, while ensuring support performance for an occupant when a collision occurs. As described above, with the support rigidity of the headrest 40 during normal operation, the rigidity related to forward tilting is weak, so immediately after a rear-end collision, the headrest 40 will tend to move forward with respect to the seat back 30 due to inertia force, and as a result, the time until the headrest 40 contacts the head of the seated person (i.e., the head contact time) is able to be shortened, which enables whiplash to be reduced. After contact with the head of the seated person, the headrest 40 tilts toward the rear while supporting the head, such that support performance for the occupant is ultimately ensured as described above.

Moreover, according to the structure of the example embodiment, the upper frame 32 that is overlapped by the main body upper portion 36a of the support bracket 36 is pipe-shaped with a round cross-section. The support bracket 36 does not need to be fixed to the upper frame 32, so there is no need to partially crush the pipe-shape to form a flat surface for welding or the like, for example. Therefore, even if the support bracket 36 abuts against the upper frame 32 when a collision occurs, such that an impact load is applied, the upper frame 32 retains the original bending strength of the pipe shape, so the support performance for the occupant when a collision occurs is able to be even better ensured. Further, according to the structure of this example embodiment, vibration of the headrest 40 is absorbed by the felt 38, by the support bracket 36 repeatedly abutting against, or being kept abutted against, the upper frame 32 via the felt 38. That is, the actual resonance magnification is less than the resonance magnification shown by point "b" in FIG. 5, due to the effect of vibration being able to be suppressed by the felt 38, together with the decrease in the resonance magnification from the weakening of the support rigidity. Also, because the vibration is absorbed, abnormal noise resulting from the support bracket 36 repeatedly abutting against the upper frame 32 can be prevented from occurring.

Figure 6:
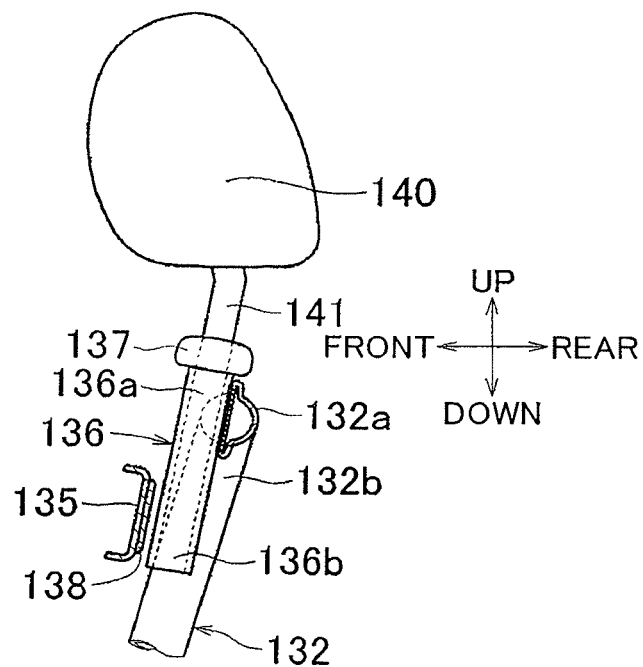
FIG. 6 is a sectional view of a mounting portion of a headrest according to another example embodiment of the invention, shown cut in a position similar to that in FIG. 3.
Figure 7A:
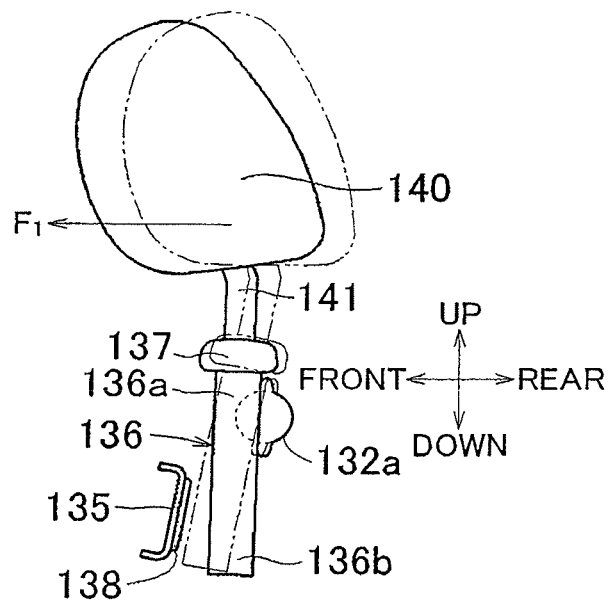
FIG. 7A is a view illustrating operation when forward force is applied to the headrest according to the other example embodiment.
Figure 7B:
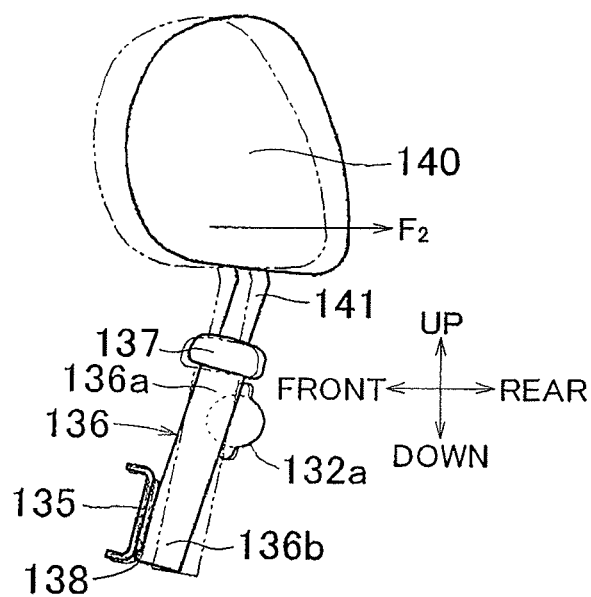
FIG. 7B is a view illustrating operation when rearward force is applied to the headrest according to the other example embodiment.

The seat back frame 31 according to the invention is not limited to the example embodiment described above, but may be embodied by various other modes. The stay 41 of the headrest 40 in the example embodiment is attached to the reinforcing member 35 provided on the seat back frame 31 via the headrest support 37 and the support bracket 36. However, the stay 41 of the headrest 40 may also be attached by being welded directly to the reinforcing member 35. In this mode, the stay 41 corresponds to the mounting member of the headrest 40 of the invention. Also, the support bracket 36 in the example embodiment has a dimension such that the main body upper portion 36a and the main body lower portion 36b face the front sides of the upper frame 32 and the reinforcing member 35. However, if the main body upper portion 36a and the main body lower portion 36b are arranged overlapping with the upper frame 32 and the reinforcing member 35, on the front sides thereof, when viewed from the front of the seat in the longitudinal direction of the vehicle, the support bracket 36 does not necessarily have to be as described above. Also, the support bracket 36 in the example embodiment is arranged overlapping with the upper frame 32 and the reinforcing member 35, on the front sides thereof, when viewed from the front of the seat in the longitudinal direction of the vehicle, and the fixing portion 36c provided on the main body lower portion 36b of the support bracket 36 that overlaps with the reinforcing member 35 is fixed to the reinforcing member 35. However, as illustrated by another example embodiment shown in FIG. 6, the structure may also be such that a support bracket 136 is arranged overlapping with the front side of an upper portion 132a of an upper frame 132 and a rear side of a reinforcing member 135, and a main body upper portion 136a of a support bracket 136 that overlaps with the reinforcing member 135 may be fixed to the upper portion 132a of the upper frame 132. According to this kind of structure, as shown in FIGS. 7A and 7B, when forces $F_1$ and $F_2$ in the front-rear directions are applied to a headrest 140, the headrest 140 will tilt about the main body upper portion 136a of the support bracket 136 that is fixed to the upper frame 132. When the forward force $F_1$ is applied to the headrest 140, the main body lower portion 136b will not be blocked by a reinforcing member 135, so the headrest 140 will be able to tilt forward. However, when the rearward force $F_2$ is applied to the headrest 140, the main body lower portion 136b of the support bracket 136 will abut against the rear side of the reinforcing member 135 via felt 138, so tilting of the headrest 140 will be inhibited. Therefore, the other example embodiment illustrated in FIGS. 6 and 7A and 7B displays similar effects as the example embodiment described above. Also, in the example embodiment, the main body upper portion 36a of the support bracket 36 that faces the upper frame 32 is arranged with a slight gap between it and the upper frame 32. However, as long as the main body upper portion 36a of the support bracket 36 is not fixed to the upper frame 32, this gap may be closed and the main body upper portion 36a of the support bracket 36 may be contacting the upper frame 32. In this case as well, as long as a large rearward load is not applied to the support bracket 36, the support bracket 36 will basically be supported by only the reinforcing member 35, so an effect similar to that obtained by the example embodiment is displayed. Further, in the example embodiment, the felt 38 for preventing an abnormal noise from being produced due to the support bracket 36 abutting against the upper frame 32 is placed on the upper frame 32 side, but this felt 38 may also be placed on the support bracket 36 side. Also, instead of this felt 38, a pad using other material with a vibration absorbing effect, such as rubber or gel, may also be used.

What is claimed is:

1. A seat back frame of a vehicle seat, in which a headrest is able to be mounted to an upper portion thereof, comprising:
   an upper frame member that forms an upper side;
   a reinforcing member that is provided parallel to and below the upper frame member; and
   a headrest mounting member for mounting the headrest, that extends across both the upper frame member and the reinforcing member when viewed from a front side of the vehicle seat, wherein
   when the headrest is in an upright position, the headrest mounting member is arranged such that, in one location, from among a location where the headrest mounting member extends across the upper frame member and a location where the headrest mounting member extends across the reinforcing member, the headrest mounting member is fixed to one of the upper frame member and the reinforcing member, and in a second location, the headrest mounting member is spaced with a gap from the other of the upper frame member and the reinforcing member, and
   when the headrest is tilted rearward about the one location to a rearward position, the headrest mounting member abuts against the other of the upper frame member and the reinforcing member to inhibit tilting of the headrest.

2. The seat back frame according to claim 1, wherein the member in the second location where the headrest mounting member extends across is the upper frame member, and the upper frame member has a pipe-shape with a round cross-section.

3. The seat back frame according to claim 1, wherein when the headrest tilts rearward about the one location, the headrest mounting member contacts a cushioning material at the second location.

4. The seat back frame according to claim 1, wherein the member at the one location where the headrest mounting member extends across is the reinforcing member, and the upper frame member that is the member at the second location is arranged farther toward a rear side of the vehicle seat than the headrest mounting member.

5. The seat back frame according to claim 4, wherein a lower portion of the headrest mounting member is fixed to a front surface of the reinforcing member, and an upper portion of the headrest mounting member is not fixed to the upper frame member.

6. The seat back frame according to claim 1, wherein the member at the one location where the headrest mounting member extends across is the upper frame member, and the reinforcing member that is the member at the second location is arranged farther toward the front side of the vehicle seat than the headrest mounting member.

* * * * *